United States Patent
Koczo et al.

(10) Patent No.: US 8,524,641 B2
(45) Date of Patent: Sep. 3, 2013

(54) AQUEOUS FOAMING COMPOSITIONS WITH HIGH TOLERANCE TO HYDROCARBONS

(75) Inventors: Kalman Koczo, Suffern, NY (US); Oleg Tselinik, Brooklyn, NY (US); Benjamin Falk, Yorktown Heights, NY (US); George A. Policello, Ossining, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 336 days.

(21) Appl. No.: 12/883,368

(22) Filed: Sep. 16, 2010

(65) Prior Publication Data

US 2012/0067586 A1  Mar. 22, 2012

(51) Int. Cl.
*C09K 8/62* (2006.01)

(52) U.S. Cl.
USPC ........... 507/233; 507/127; 507/136; 507/234; 507/246; 516/55

(58) Field of Classification Search
None
See application file for complete search history.

(56) References Cited

U.S. PATENT DOCUMENTS

| | | | |
|---|---|---|---|
| 4,301,868 A | 11/1981 | Scherubel et al. | |
| 4,404,112 A | 9/1983 | Scherubel et al. | |
| 4,532,132 A * | 7/1985 | Keil | 514/772 |
| 4,796,702 A | 1/1989 | Scherubel et al. | |
| 4,985,342 A | 1/1991 | Muramoto et al. | |
| 5,136,068 A * | 8/1992 | Bahr et al. | 516/20 |
| 5,998,331 A | 12/1999 | Policello | |
| 6,423,303 B1 * | 7/2002 | Ryklin et al. | 424/60 |
| 6,593,274 B2 | 7/2003 | Policello | |
| 6,673,359 B2 | 1/2004 | Policello | |
| 2007/0079963 A1 | 4/2007 | Yang et al. | |
| 2007/0129257 A1 | 6/2007 | Kippie et al. | |
| 2008/0257556 A1 | 10/2008 | Kippie et al. | |
| 2009/0253817 A1 | 10/2009 | Gu et al. | |

FOREIGN PATENT DOCUMENTS

CA   2093505   * 10/1993

OTHER PUBLICATIONS

Yang, J., Jovancicevic, V. and Ramachadran, S.: "Foam for gas well deliquification", Colloids and Surfaces A: Physicochem. Eng. Aspects, 309 (2007) 177-181.
Lea, James F.; Nickens, Henry V.; Wells, Mike R.; Gas Well Deliquification; Gulf Professional Publishing (Elsevier), 2008. Chapter 8 "Use of Foam to Deliquify Gas Wells".

* cited by examiner

*Primary Examiner* — Marc Zimmer
(74) *Attorney, Agent, or Firm* — Dominick G. Vicari; Kenneth S. Wheelock

(57) ABSTRACT

A composition for providing a stable foam with high tolerance to hydrocarbons includes (a) an aqueous liquid; (b) at least one water soluble or dispersible silicon-containing polyether foamant contained within the aqueous liquid; and (c) a non-aqueous liquid. The aqueous liquid includes water and brine. The non-aqueous liquid includes liquid hydrocarbons.

20 Claims, No Drawings

AQUEOUS FOAMING COMPOSITIONS WITH HIGH TOLERANCE TO HYDROCARBONS

FIELD OF THE INVENTION

The present invention relates to foaming compositions, and particularly to aqueous foaming compositions for use in the presence of liquid hydrocarbons.

BACKGROUND OF THE RELATED ART

Foams are often used in the petroleum industry such as in drilling, fracturing, hydrocarbon lift or foam assisted lift (FAL) due to advantages offered by their low density and their special rheological behavior. In all these applications high foam stability, often in harsh conditions (high temperature, high pressure) is important and a challenge. A particular problem is that in these processes very often both water and oil phases are present in high concentrations and the presence of oil (hydrocarbon) is often detrimental to foam stability. This is particularly important in FAL. It is a common problem in gas wells that they get partially plugged by liquid and it is estimated that out of the more than 400,000 gas wells in the US about 80% suffer from liquid loading. The most often used gas well deliquification method is to inject foamants (with a capillary or other methods) into the liquid plug so that the gas flow converts it into a foam and drives it out of the well. If the hydrocarbon to water ratio is high (more than about 10-20%) then the hydrocarbons are highly detrimental to foam stability and the currently used foamants cannot create a foam stable enough and the method fails.

U.S. Patent Publication 2007/0079963 describes a process of producing foam from a wet hydrocarbon, using a foamant comprising a siloxane. The siloxane is defined as a polysiloxane, ethoxylated, propoxylated or ethoxylated-propoxylated siloxanes and their combinations. The molecular weight of the siloxanes is specified as about 1000 to about 1,000,000 daltons and in a preferred range, 6000-60,000 daltons. In the examples (Table 3) the experiments were not successful with a 600 MW siloxane, but they were successful with a siloxane of 6000 MW and the authors concluded that the optimum is in the 6000-60,000 MW range, depending on the conditions under which it will be used. The siloxane can be also combined with organic surfactants (non-ionic, anionic, cationic). The process can be used in gas-lifted oil wells, gas-wells etc.

It is nevertheless advantageous to provide a foaming composition which is effective in the presence of high amounts of liquid hydrocarbons.

SUMMARY OF THE INVENTION

A foaming composition is provided herein. The foaming composition comprises:
(a) an aqueous liquid;
(b) at least one water soluble or dispersible silicon-containing polyether foamant contained within the aqueous liquid; and
(c) a non-aqueous liquid
where
the aqueous liquid (a) comprises water and minerals (brine), the non-aqueous liquid (c) substantially comprises liquid hydrocarbons, and the silicon-containing polyether foamant (b) in the aqueous liquid (a) is defined as $$M_a M^A_b M^B_c M^C_d M^E_e D_f D^E_g T_h T^E_i Q_j \text{ with}$$

$M = R^1 R^2 R^3 SiO_{1/2}$;
$M^A = R^4 R^5 R^6 SiR^E$;
$M^B = [(R^7 R^8 R^9 Si)_k R^{10}]_l Si(R^{11})_m (R^{12})_n R^E$;
$M^C = [(R^{13} R^{14} R^{15} Si)_o R^{16}]_p Si(R^{17})_q (R^{18})_r O_{1/2}$;
$M^E = R^{19} R^{20} R^E SiO_{1/2}$;
$D = R^{21} R^{22} SiO_{2/2}$;
$D^E = R^{23} R^E SiO_{2/2}$;
$T = R^{24} SiO_{3/2}$;
$T^E = R^E SiO_{2/2}$; and
$Q = SiO_{4/2}$;
wherein
$R^1$, $R^2$, $R^3$, $R^4$, $R^5$, $R^6$, $R^7$, $R^8$, $R^9$, $R^{11}$, $R^{12}$, $R^{13}$, $R^{14}$, $R^{15}$, $R^{17}$, $R^{18}$, $R^{19}$, $R^{20}$, $R^{21}$, $R^{22}$, $R^{23}$ and $R^{24}$ are each independently selected from the group of $OR^{25}$ or monovalent hydrocarbon radicals, optionally containing heteroatoms and hydroxyl groups, having from about 1 to about 20 carbon atoms, preferably from about 1 to about 15 carbon atoms and more preferably from about 1 to about 10 carbon atoms;

$R^{10}$ and $R^{16}$ are polyvalent linear or branched unsaturated or saturated hydrocarbon radicals, optionally containing heteroatoms and hydroxyl groups, subject to the limitation that the valency of $R^{10}$ and $R^{16}$ is at least one and less than about 30 carbon atoms, preferably less than about 25 carbon atoms, and more preferably less than about 20 carbon atoms;

$R^E$ is a monovalent radical defined as: $-R^{26}-(C_2H_4O)_s(C_3H_6O)_t(C_4H_8O)_u-R^{27}$ with the provision that the polymer must contain at least one $R^E$ group;

$R^{25}$ is a monovalent, linear or branched unsaturated or saturated hydrocarbon radical optionally containing heteroatoms and hydroxyl groups, having from about 1 to about 20 carbon atoms, preferably from about 1 to about 15 carbon atoms and more preferably from about 1 to about 10 carbon atoms;

$R^{26}$ is oxygen or a divalent, linear or branched unsaturated or saturated hydrocarbon radical, optionally containing heteroatoms and hydroxyl groups, with about 2 to about 30 carbon atoms, preferably about 2 to about 25 carbon atoms, more preferably about 2 to about 20 carbon atoms;

$R^{27}$ is H or $-C(=O)CH_3$ or a monovalent saturated or unsaturated hydrocarbon radical, optionally containing heteroatoms and hydroxyl groups, having from 1 to about 30 carbon atoms, preferably 1 to about 25 carbon atoms, more preferably 1 to about 20 carbon atoms, optionally containing heteroatoms and hydroxyl group;

subscripts a, d, e, f, g, h, i and j are 0 or positive subject to the limitation $1 \leq a+b+c+d+e+f+g+h+i+j<300$, preferably $1 \leq a+b+c+d+e+f+g+h+i+j<200$, more preferably $1 \leq a+b+c+d+e+f+g+h+i+j<100$;

subscript b is 0 or 1 subject to the limitation if b is 1 then $a+c+d+e+f+g+h+i+j=0$;

subscript c is 0 or 1 subject to the limitation if c is 1 then $a+b+d+e+f+g+h+i+j=0$;

subscript k is positive subject to the limitation $0<k<30$, preferably $0<k<25$, more preferably $0<k<20$ and k is equal the valency of $R^{10}-1$;

subscripts l, m and n are zero or positive subject to the limitation $l+m+n=3$;

subscript o is positive subject to the limitation that $0<o<30$, preferably $0<o<25$, more preferably $0<o<20$ and o is equal the valency of $R^{16}-1$;

subscripts s, t and u are zero or positive subject to the limitation that $s+t+u \geq 3$.

Also provided is a method of making a stable foam from aqueous liquids by combining said aqueous liquids with a gas, in the presence of hydrocarbon liquids, with a foamant comprising at least one, water soluble or dispersible, silicon-containing polyether defined herein.

Also provided is a method for removing liquid loading from gas wells comprising adding the foamant produced by the methods described herein to the gas wells and removing stable foam from the gas wells once formed.

Also provided is a method for foam fracturing in drilling operations comprising adding the foamant produced according to the methods described herein to the oil well being drilled.

A method for lifting formation fluids to the surface in oil wells is also provided as part of the present invention. The method comprises adding the foamant produced according to the methods described herein to said oil wells having fluids and lifting said formation fluids to the surface of said oil wells after they combine with said foamant.

These features, together with other objects and advantages which will become subsequently apparent, reside in the details of the composition, how it is made and the methods on how it is used as more fully hereinafter described and claimed.

DETAILED DESCRIPTION OF THE INVENTION

In the specification and claims herein, the following terms and expressions are to be understood as indicated.

The expression "hydrocarbon radicals" means any hydrocarbon group from which one or more hydrogen atoms have been removed and is inclusive of alkyl, alkenyl, alkynyl, cyclic alkyl, cyclic alkenyl, cyclic alkynyl, aryl, aralkyl and arenyl, and optionally it is substituted with oxygen, nitrogen, or sulfur.

The term "alkyl" means any monovalent, saturated, straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The expressions "cyclic alkyl", "cyclic alkenyl", and "cyclic alkynyl" include bicyclic, tricyclic and higher cyclic structures as well as the aforementioned cyclic structures further substituted with alkyl, alkenyl, and/or alkynyl groups. Representative examples include norbornyl, norbornenyl, ethylnorbornyl, ethylnorbornenyl, cyclohexyl, ethylcyclohexyl, ethylcyclohexenyl, cyclohexylcyclohexyl and cyclododecatrienyl.

The term "aryl" means any monovalent aromatic hydrocarbon group; the term "aralkyl" means any alkyl group (as defined herein) in which one or more hydrogen atoms have been substituted by the same number of like and/or different aryl (as defined herein) groups; and, the term "arenyl" means any aryl group (as defined herein) in which one or more hydrogen atoms have been substituted by the same number of like and/or different alkyl groups (as defined herein). Examples of aryls include phenyl and naphthalenyl. Examples of aralkyls include benzyl and phenethyl. Examples of arenyls include tolyl and xylyl.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

For the purpose of this disclosure, the term "immiscible" means that the two liquids have no or limited solubility in each other. Further, emulsions may also contain gases and solids. One of the immiscible liquids in an emulsion is generally polar, and often water based and the other liquid is generally non-polar, generally defined as an oil phase. The emulsion can be, for example, a water-in-oil, or an oil-in-water emulsion. In addition, it is also possible to prepare emulsions of emulsions and these are generally known as multiple emulsions, such as water-in-oil-in-water, oil-in-water-in-oil etc.

The expression "water soluble or dispersible" means that the surfactant forms either a clear solution or a hazy, but stable dispersion in deionized water, at 1% concentration and at 25° C. temperature.

Also, as used in the specification and including the appended claims, the singular forms "a," "an," and "the" include the plural, and reference to a particular numerical value includes at least that particular value, unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

The present invention provides for foaming compositions comprising
(a) an aqueous liquid;
(b) at least one water soluble or dispersible silicon-containing polyether foamant contained within the aqueous liquid; and
(c) a non-aqueous liquid
where
the aqueous liquid (a) comprises water and minerals (brine), the non-aqueous liquid (c) substantially comprises liquid hydrocarbons, and the silicon-containing polyether foamant (b) in the aqueous liquid (a) is defined as $$M_a M^A_b M^B_c M^C_d M^E_e D_f D^E_g T_h T^E_i Q_j \text{ with}$$

$M = R^1 R^2 R^3 SiO_{1/2}$;
$M^A = R^4 R^5 R^6 SiR^E$;
$M^B = [(R^7 R^8 R^9 Si)_k R^{10}]_l Si(R^{11})_m (R^{12})_n R^E$;
$M^C = [(R^{13} R^{14} R^{15} Si)_o R^{16}]_p Si(R^{17})_q (R^{18})_r O_{1/2}$;
$M^E = R^{19} R^{20} R^E SiO_{1/2}$;
$D = R^{21} R^{22} SiO_{2/2}$;
$D^E = R^{23} R^E SiO_{2/2}$;
$T = R^{24} SiO_{3/2}$;
$T^E = R^E SiO_{2/2}$; and
$Q = SiO_{4/2}$;
wherein
$R^1, R^2, R^3, R^4, R^5, R^6, R^7, R^8, R^9, R^{11}, R^{12}, R^{13}, R^{14}, R^{15}, R^{17}, R^{18}, R^{19}, R^{20}, R^{21}, R^{22}, R^{23}$ and $R^{24}$ are each independently selected from the group of $OR^{25}$ or monovalent hydrocarbon radicals, optionally containing heteroatoms and hydroxyl groups, having from about 1 to about 20 carbon atoms, preferably from about 1 to about 15 carbon atoms and more preferably from about 1 to about 10 carbon atoms;
$R^{10}$ and $R^{16}$ are polyvalent linear or branched unsaturated or saturated hydrocarbon radicals, optionally containing heteroatoms and hydroxyl groups, subject to the limitation that the valency of $R^{10}$ and $R^{16}$ is at least one and less than about 30 carbon atoms, preferably less than about 25 carbon atoms, and more preferably less than about 20 carbon atoms;
$R^E$ is a monovalent radical defined as: $-R^{26}-(C_2H_4O)_s(C_3H_6O)_t(C_4H_8O)_u-R^{27}$ with the provision that the polymer must contain at least one $R^E$ group;
$R^{25}$ is a monovalent, linear or branched unsaturated or saturated hydrocarbon radical optionally containing heteroatoms and hydroxyl groups, having from about 1 to about 20 carbon atoms, preferably from about 1 to about 15 carbon atoms and more preferably from about 1 to about 10 carbon atoms;
$R^{26}$ is oxygen or a divalent, linear or branched unsaturated or saturated hydrocarbon radical, optionally containing heteroatoms and hydroxyl groups, with about 2 to about 30 carbon atoms, preferably about 2 to about 25 carbon atoms, more preferably about 2 to about 20 carbon atoms;
$R^{27}$ is H or $-C(=O)CH_3$ or a monovalent saturated or unsaturated hydrocarbon radical, optionally containing heteroatoms and hydroxyl groups, having from 1 to about 30 carbon atoms, preferably 1 to about 25 carbon atoms, more preferably 1 to about 20 carbon atoms, optionally containing heteroatoms and hydroxyl group;
subscripts a, d, e, f, g, h, i and j are individually 0 or positive subject to the limitation $1 \leq a+b+c+d+e+f+g+h+i+j<300$, preferably $1 \leq a+b+c+d+e+f+g+h+i+j<200$, more preferably $1 \leq a+b+c+d+e+f+g+h+i+j<100$;
subscript b is 0 or 1 subject to the limitation if b is 1 then $a+c+d+e+f+g+h+i+j=0$;
subscript c is 0 or 1 subject to the limitation if c is 1 then $a+b+d+e+f+g+h+i+j=0$;
subscript k is positive subject to the limitation $0<k<30$, preferably $0<k<25$, more preferably $0<k<20$ and k is equal the valency of $R^{10}-1$;
subscripts l, m and n are individually zero or positive subject to the limitation $l+m+n=3$;
subscript o is positive subject to the limitation that $0<o<30$, preferably $0<o<25$, more preferably $0<o<20$ and o is equal the valency of $R^{16}-1$;
subscripts s, t and u are individually zero or positive subject to the limitation that $s+t+u \geq 3$.

Another aspect of the present invention is directed to at least one, water soluble or dispersible, silicon-containing polyether foamant (b), of the present invention comprising the compound having the following formula:

$$M_a D_f D^E_g \text{ with}$$

$M = R^1 R^2 R^3 SiO_{1/2}$;
$D = R^{21} R^{22} SiO_{2/2}$;
$D^E = R^{23} R^E SiO_{2/2}$;
wherein
$R^1, R^2, R^3, R^{21}, R^{22}$ and $R^{23}$ are each independently selected from the group of $OR^{25}$ or monovalent hydrocarbon radicals, optionally containing heteroatoms and hydroxyl groups, having from about 1 to about 20 carbon atoms, preferably from about 1 to about 15 carbon atoms and more preferably from about 1 to about 10 carbon atoms;
$R^E$ is a monovalent radical defined as: $-R^{26}-(C_2H_4O)_s(C_3H_6O)_t(C_4H_8O)_u-R^{27}$ with the provision that the polymer must contain at least one $R^E$ group;
$R^{25}$ is a monovalent, linear or branched unsaturated or saturated hydrocarbon radical optionally containing heteroatoms and hydroxyl groups, having from about 1 to about 20 carbon atoms;
$R^{26}$ is oxygen or a divalent, linear or branched unsaturated or saturated hydrocarbon radical, optionally containing heteroatoms and hydroxyl groups, with about 2 to about 20 carbon atoms;
$R^{27}$ is H or $-C(=O)CH_3$ or a monovalent saturated or unsaturated hydrocarbon radical, optionally containing heteroatoms and hydroxyl groups, having from 1 to about 20 carbon atoms, optionally containing heteroatoms and hydroxyl group;
subscripts a, f and g are individually 0 or positive subject to the limitation $a+f+g<15$;
subscripts s, t and u are individually zero or positive subject to the limitation that $s+t+u \geq 3$ and,
the average molecular weight of the polymers is less than 1,000 daltons.

In another embodiment, the present invention is directed to at least one, water soluble or dispersible, silicon-containing polyether foamant (b), of the present invention comprising the compound having the following formula:

$$[(R^7 R^8 R^9 Si)_k R^{10}]_l Si(R^{11})_m (R^{12})_n R^E;$$

wherein
$R^7, R^8, R^9, R^{11}$ and $R^{12}$ are each independently selected from the group of $OR^{25}$ or monovalent hydrocarbon radicals, optionally containing heteroatoms and hydroxyl groups, having from about 1 to about 20 carbon atoms;
$R^{10}$ is a polyvalent linear or branched unsaturated or saturated hydrocarbon radical, optionally containing heteroatoms and hydroxyl groups, subject to the limitation that the valency of $R^{10}$ is at least one and less than about 30 carbon atoms;
$R^E$ is a monovalent radical defined as: $-R^{26}-(C_2H_4O)_s(C_3H_6O)_t(C_4H_8O)_u-R^{27}$ with the provision that the polymer must contain at least one $R^E$ group;
$R^{25}$ is a monovalent, linear or branched unsaturated or saturated hydrocarbon radical optionally containing heteroatoms and hydroxyl groups, having from about 1 to about 20 carbon atoms;
$R^{26}$ is oxygen or a divalent, linear or branched unsaturated or saturated hydrocarbon radical, optionally containing heteroatoms and hydroxyl groups, with about 2 to about 30 carbon atoms;
$R^{27}$ is H or $-C(=O)CH_3$ or a monovalent saturated or unsaturated hydrocarbon radical, optionally containing heteroatoms and hydroxyl groups, having from 1 to about 30 carbon atoms; and subscripts l, m and n are individually zero or positive subject to the limitation l+m+n=3.

In another embodiment, the present invention is directed to at least one, water soluble or dispersible, silicon-containing polyether foamant (b), of the present invention comprising the compound having the following formula:

$M^C_d D_f D^E_g$ with $M^C = [(R^{13}R^{14}R^{15}Si)_o R^{16}]_p Si(R^{17})_q (R^{18})_r O_{1/2}$;
$D = R^{21}R^{22}SiO_{2/2}$;
$D^E = R^{23}R^E SiO_{2/2}$;
wherein
$R^{13}$, $R^{14}$, $R^{15}$, $R^{17}$, $R^{18}$, $R^{21}$, $R^{22}$ and $R^{23}$ are each independently selected from the group of $OR^{25}$ or monovalent hydrocarbon radicals, optionally containing heteroatoms and hydroxyl groups, having from about 1 to about 20 carbon atoms;
$R^{16}$ is a polyvalent linear or branched unsaturated or saturated hydrocarbon radicals, optionally containing heteroatoms and hydroxyl groups, subject to the limitation that the valency of $R^{16}$ is at least one and less than about 30 carbon atoms;
$R^E$ is a monovalent radical defined as: —$R^{26}$—$(C_2H_4O)_s (C_3H_6O)_t (C_4H_8O)_u$—$R^{27}$ with the provision that the polymer must contain at least one $R^E$ group;
$R^{25}$ is a monovalent, linear or branched unsaturated or saturated hydrocarbon radical optionally containing heteroatoms and hydroxyl groups, having from about 1 to about 20 carbon atoms;
$R^{26}$ is oxygen or a divalent, linear or branched unsaturated or saturated hydrocarbon radical, optionally containing heteroatoms and hydroxyl groups, with about 2 to about 30 carbon atoms;
$R^{27}$ is H or —C(=O)CH$_3$ or a monovalent saturated or unsaturated hydrocarbon radical, optionally containing heteroatoms and hydroxyl groups, having from 1 to about 30 carbon atoms;
subscripts d, f and g are individually 0 or positive subject to the limitation d+f+g<20;
subscript o is positive subject to the limitation that 0<o<30 and o is equal the valency of $R^{16}$−1; and
subscripts s, t and u are individually zero or positive subject to the limitation that s+t+u≧3.

In another embodiment, the present invention is directed to at least one, water soluble or dispersible, silicon-containing polyether foamant (b), of the present invention comprising the compound having the following formula:

$M^A = R^4 R^5 R^6 SiR^E$;

wherein
$R^4$, $R^5$ and $R^6$ are each independently selected from the group of $OR^{25}$ or monovalent hydrocarbon radicals, optionally containing heteroatoms and hydroxyl groups, having from about 1 to about 20 carbon atoms;
$R^E$ is a monovalent radical defined as: —$R^{26}$—$(C_2H_4O)_s (C_3H_6O)_t (C_4H_8O)_u$—$R^{27}$ with the provision that the polymer must contain at least one $R^E$ group;
$R^{25}$ is a monovalent, linear or branched unsaturated or saturated hydrocarbon radical optionally containing heteroatoms and hydroxyl groups, having from about 1 to about 20 carbon atoms;
$R^{26}$ is oxygen or a divalent, linear or branched unsaturated or saturated hydrocarbon radical, optionally containing heteroatoms and hydroxyl groups, with about 2 to about 30 carbon atoms;
$R^{27}$ is H or —C(=O)CH$_3$ or a monovalent saturated or unsaturated hydrocarbon radical, optionally containing heteroatoms and hydroxyl groups, having from 1 to about 30 carbon atoms; and
subscripts s, t and u are individually zero or positive subject to the limitation that s+t+u≧3.

According to the present invention, there are further provided compositions wherein the aqueous liquid (a) can be essentially pure water, or alternatively, water with varying amounts of solid (particulate) materials, and minerals, salts or other chemicals.

The non-aqueous liquid of the present invention is any liquid substantially insoluble with the aqueous liquid. For example, the non-aqueous liquid can be, for example, linear or branched, cyclic or acyclic, saturated or unsaturated, aliphatic or aromatic hydrocarbons. The hydrocarbons of the present invention typically contain at least about six carbon atoms and can be unsubstituted, or alternatively, substituted with one or more heteroatom-containing group (e.g., hydroxyl, amino, carboxyl, amide, anhydride, ester, or ether groups) as long as the hydrocarbons remain mainly insoluble with the aqueous liquid.

Some examples of non-aqueous liquids include, but are not limited to, halogenated or non-halogenated hydrocarbons having about 2 to about 30 carbons atoms, and more particularly, halogenated or non-halogenated ethenes, butadienes, pentanes, hexanes, heptanes, octanes, benzenes, toluene, ethylbenzenes, xylenes, naphthalene, cresols, naphtha, fats, lubrication oils, petroleum, gasoline, diesel fuel, crude oil, fuel oils, jet fuels, heating oils, cleaning oils, vegetable oils, mineral oils, crude oil, gas condensates and tar or bitumen derivatives.

Light condensates in gas wells, containing hydrocarbons having from about 5 to about 8 carbon atoms (pentanes, hexanes, heptanes, octanes etc.) are particularly important in gas wells and they can have a particularly detrimental effect on foam stability.

The ratio of the aqueous (a) and non-aqueous (c) liquids in the present invention is from about 2.5:97.5 to about 99.9:0.1 by volume.

The concentration of the water soluble or dispersible, silicon-containing polyether foamant (b), relative to the sum of the aqueous (a) and non-aqueous (c) liquids in the present invention is from about 0.0001% to about 10%, preferably from about 0.001% to about 5% and more preferably from about 0.005% to about 1%. The compositions of the present invention can comprise not only at least one, water soluble or dispersible, silicon-containing polyether foamant (b), but optionally may contain other, organic or silicone foamants, which can be water soluble or dispersible or insoluble in water. The foamants typically used in the petroleum industry can contain anionic, non-ionic, cationic, zwitterionic or amphoteric surfactants. These foamant can be water-soluble or oil-soluble.

Typical anionic surfactants may include alkali salts of fatty acids, such as sodium oleate; alcohol sulfates, alcohol ether sulfates, sulfates of ethoxylated alcohols, alkylaryl sulfonates, alkylphenol sulfonates, alkyl ether sulfonates, naphthalene sulfonates, carboxylated alcohol or alkylphenol ethoxylates, sulfosuccinates, amide sulfonates.

Typical non-ionic surfactants may include silicone polyether copolymers, ethoxylated alcohols, alkylphenol-alkoxylates, polyols, polyether block-copolymers, glycerol esters and polyethers, glycol esters, fatty acids (lauryl acid, oleic acid, stearic acid etc.), alkoxylated fatty acids and fatty esters, sorbitan derivatives, sucrose and glucose esters.

Typical cationic surfactants may include ethylene diamine alkoxylates, aliphatic and rosin amine alkoxylates, quaternary ammonium salts, alkylpyridinium salts, alkoxylated tallow amines, Gemini, bis or di-quaternary ammonium surfactants, amidopropyltertiary amine salts etc.

Typical zwitterionic and amphoteric surfactants are amino acid salts, alkylbetains, such as coco-, decyl-, cetyl-, lauryl- or oleyl-betains, amidopropyl betaines, imidazolins and imidazolin derivatives, sulfobetaines, sultaines, aminopropionates, amine oxides etc.

The concentration of the water soluble or dispersible silicon-containing polyether foamant (b), relative to the total concentration of foamants in the present invention is from about 0.01% to about 100%.

Most of the typical uses of the compositions in the present invention are in the petroleum industry. Foams can be a low cost alternative of drilling liquids to remove drill cuttings from the drill and lift them from the bore or open the formation for oil or gas production. An advantage of using foam versus compressed gas is that the foam structure prevents the compressed gas from escaping. Another application is in well stimulation, including foam fracturing where the special rheological properties of foams are utilized. Hydrocarbon lift, crude oil lift are other examples. An important use of foams is to remove liquid loading from gas wells, the foam assisted lift (FAL). In FAL the silicon-containing polyether foamant (b), alone or in combination with other foamants and additives, is injected by batch treatment or continuously, through the casing or the annulus or with capillary strings into the loading liquid and the gas of the well to convert this liquid into a foam. In other applications, such in drilling foams, the gas phase of the foam can be other gases, such as nitrogen, air, methane or any other, suitable gaseous material.

In all these applications both aqueous and non-aqueous liquids can be present at the same time and the foam has to be stable for a reasonable amount of time, in the presence of a wide range of aqueous/non-aqueous phase ratios, a wide range of salt concentrations, pressures and temperatures and also it the presence of acids and bases.

Another possible application of the present foaming compositions is in the flotation processes of oil sand processing or in mining operations.

Due to the wide range of conditions in the well a wide range of foamants has to be formulated using these foamants, and other ingredients, in various ratios.

A foamant formulation often contains several ingredients other than foamants, such as corrosion inhibitors, antioxidants, biocides, foam boosters; antifreeze agents, such as various glycols, glycerol, paraffin inhibitors, pour point depressants, asphaltene dispersants, scale inhibitors, gas hydrate inhibitors, solvents, such as isopropyl alcohol (IPA), etc. Such additives are selected based upon the intended use and such selection is within the knowledge of one of skill in the art, as are the required amounts of such additives known to one of skill in the art.

Other optional ingredients may be added in the compositions of the present invention including coupling agents, e.g., silane coupling agents, curing aids, e.g., including activators, retarders and accelerators, processing additives such as oils, plasticizers, tackifying resins, silicas, other fillers, pigments, fatty acids, zinc oxide, waxes, antiozonants, peptizing agents, reinforcing materials such as, for example, carbon black; wetting agents, anticorrosion additives, hydrogen sulfide scavengers, biocides and so forth. Such additives are selected based upon the intended use and such selection is within the knowledge of one of skill in the art, as are the required amounts of such additives known to one of skill in the art.

In an embodiment the invention includes a foaming method employing any of the compositions described herein.

In an embodiment the foaming method includes the use of a composition wherein the volume ratio of the aqueous liquid to the non-aqueous liquid ranges from about 2.5:97.5 to 99.9:01.

In an embodiment the foaming method includes the use of a composition wherein the concentration of the water soluble or dispersible, silicon-containing polyether foamant (b), relative to the sum of the aqueous and non-aqueous liquids is from about 0.0001% to about 10%.

In an embodiment the foaming method includes the use of a composition wherein said composition includes not only the water soluble or dispersible, silicon-containing polyether foamant (b), but further comprises one or more other, organic or silicone, anionic, non-ionic, cationic, zwitterionic or amphoteric foamants and the weight ratio of the silicon-containing polyether foamant (b) to the total amount of organic and silicone foamants is from about 0.01% to about 100%.

In an embodiment the invention includes a method for removing liquid loading from gas wells comprising adding the foamant to said gas wells and removing said stable foam from said gas wells once formed or while being drilled.

In an embodiment the invention includes a method for lifting formation fluids to the surface in oil wells comprising adding the foamant produced according to the method of claim 12 to said oil wells having fluids and lifting said formation fluids to the surface of said oil wells after they combine with said foamant.

EXAMPLES

The Examples below are presented to illustrate features of the invention and are not to be considered as limitations on the scope of the invention. Comparative examples are presented for comparison purposes and do not illustrate the invention.

Various aliphatic hydrocarbons were used as hydrocarbon phase. Hexanes, pentanes (HPLC grade), cyclohexane (>99% essay) were purchased from Fisher Scientific, n-octane and n-decane were purchased from Aldrich.

Synthetic Example A

Five hundred and ten grams (510 g) of a polyether with the average formula of $CH_2=CHCH_2(OCH_2CH_2)_{10}OH$, 0.55 g of sodium propionate and 25 ppm of Pt as chloroplatinic acid were added into a four neck round bottom flask which was equipped with a condenser (nitrogen attached), an overhead stirrer, a heating mantle and a thermocouple. The mixture was heated to 90° C. under mixing. Heptamethyltrisiloxane (157.4 g) was slowly added through an addition funnel into the flask over 30 min. The exothermic reaction was controlled with slow addition and cooling with ice water. Then the reaction was completed by further stirring for another four hours and the completion of the reaction was verified by gas chromatography (no heptamethyltrisiloxane left). After cooling the mixture to 40° C. sodium bicarbonate and Celite 545 were added and stirred for 10 min and then the product was pressure filtered through a 5-micron filer pad. The product was a liquid and exhibited an amber color. The average molecular weight and water solubility of the foaming agent product of this example are set forth in Table 1 below.

Synthetic Example B

Five hundred and fifty-five grams (550 g) of a polyether with the average formula of $CH_2=CHCH_2(OCH_2CH_2)_{14.4}OH$, 0.55 g of sodium propionate and 25 ppm of Pt as chloroplatinic acid were added into a four neck round bottom flask which was equipped with a condenser (nitrogen attached), an overhead stirrer, a heating mantle and a thermocouple. The mixture was heated to 90° C. under mixing. Heptamethyltrisiloxane (123.0 g) was slowly added through an addition funnel into the flask over 30 min. The exothermic reaction was controlled with slow addition and cooling with ice water. Then the reaction was completed by further stirring for another three hours and the completion of the reaction was verified by gas chromatography (no heptamethyltrisiloxane left). After cooling the mixture to 40° C. sodium bicarbonate and Celite 545 were added and stirred for 10 min and then the product was pressure filtered through a 5-micron filer pad. The product was a solid and exhibited an amber color. The average molecular weight and water solubility of the foaming agent product of this example are set forth in Table 1 below.

Synthetic Example C 1-(2-Trimethylsilylethyl)-1,1,3,3-tetramethyldisiloxane (26.4 g), an allyl-functional polyether with the average structure of $CH_2=CHCH_2(OCH_2CH_2)_{10}OH$) (73.6 g) and sodium propionate (0.1 g) were charged into a 250 mL round bottom flask. The flask was equipped with an overhead stirrer, nitrogen blanket, temperature controller, condenser, and a heating mantle. The mixture was heated to 80° C. An ethanol solution of chloroplatinic acid was added (10 ppm based on Pt). The reactor was held at 80° C. until no Si—H was detectable by alkaline digestion. The product was transferred to a rotary evaporator and stripped at 90° C. for 2 hours at 50 Torr. The product was pressure filtered through a 5-micron filter pad. The resulting material was a slightly yellow clear fluid at room temperature. The average molecular weight and water solubility of the foaming agent product of this example are set forth in Table 1 below.

Synthetic Example D

1-Trimethylsilyl-2-dimethylsilylethane (35.6 g), an allyl-functional polyether with the average structure of $CH_2=CHCH_2O(CH_2CH_2O)_{14.4}H$ (200 g) and isopropanol (50 g) were combined in a 500 mL round bottom flask. The flask was equipped with an overhead stirrer, condenser, heating mantle, thermocouple with temperature controller. The reaction medium was heated to 80° C. and Karstedt's catalyst (10 ppm based on Pt) was added. An exotherm was noticed and after 10 minutes in the presence of catalyst the reactor reached a temperature of 97° C. Once the exotherm ceased, the reactor cooled to 80° C. and was stirred for an additional 2 hours. The product was transferred to a single neck flask and stripped for 1 hour at 90° C. and 50 Torr in a rotary evaporator. The resulting material was a yellow wax at room temperature. The average molecular weight and water solubility of the foaming agent product of this example are set forth in Table 1 below.

Synthetic Example E

1-Trimethylsilyl-2-dimethylsilylethane (17.8 g), an allyl-functional polyether with the average structure of $CH_2=CHCH_2O(CH_2CH_2O)_{32}H$ (200 g) and isopropanol (50 g) were combined in a 500 mL round bottom flask. The flask was equipped with an overhead stirrer, condenser, heating mantle, and a thermocouple with temperature controller. The reaction medium was heated to 80° C. and Karstedt's catalyst (10 ppm based on Pt) was added. The reaction was stirred at 80° C. for 48 hours. The product was transferred to a single neck flask and stripped for 1 hour at 90° C. and 50 Torr in a rotary evaporator. The resulting material was a yellow/brown wax at room temperature. The average molecular weight and water solubility of the foaming agent product of this example are set forth in Table 1 below.

Synthetic Example F

Epoxy terminated allyl polyethyleneoxide (8 EO, 25.5 g), 47.5 g of heptamethyltrisiloxane and 0.1 g of sodium propionate were combined in a 250 mL, four neck round bottom flask, equipped with a mechanical agitator, a Claisen adapter containing a reflux condenser and a thermometer (with Therm-O-Watch), a nitrogen bypass, and a 100 mL addition funnel. The mixture was heated to 90° C. and catalyzed with 0.26 mL of chloroplatinic acid solution (1% in ethanol). The reaction mixture exothermed at 103° C. after one minute. The remaining 102 g of epoxy terminated allyl polyethyleneoxide was added from the addition funnel at a rate sufficient to maintain the reaction temperature at approximately 100° C. The reaction mixture showed no traces of SiH when introduced to a fermentation tube containing KOH/water/ethanol solution. The product was then filtered through a fine filter pad stripped on a Rotovap for 1.5 hours at 70° C. and to 1.0 mmHg to afford a clear amber liquid with an epoxy content of 5.1 wt % (100% expected epoxy).

The epoxy modified trisiloxane intermediate (100.0 g), along with 18.40 g diethanolamine (corresponding to 1.88 mole % mole excess), and 50.74 g of 2-propanol were added to a 250 mL, four neck round bottom flask, equipped with a mechanical agitator, a Claisen adapter containing a reflux condenser and a thermometer (with Therm-O-Watch), a nitrogen bypass. The mixture was heated to 80° C. and catalyzed with 0.17 g titanium (VI) butoxide. The reaction time was approximately 48 hours at which point the reaction mixture was cooled to ambient and 1.0 g water was added to deactivate the catalyst. The product was then filtered through a fine filter pad and stripped on a Rotovap for 1.5 hours at 70° C. and to 1.0 mm Hg to afford a clear amber liquid. The structures for the epoxy terminated allyl polyethyleneoxide and the ethylenediamine modified trisiloxane alkoxylate were confirmed by $^{29}Si$ and $^{13}C$ NMR. The average molecular weight and water solubility of the foaming agent product of this example are set forth in Table 1 below.

Synthetic Example G

Di-t-butoxymethylsilane (44.6 g), an allyl-functional polyether with the average structure of $CH_2=CHCH_2O(CH_2CH_2O)_{14.4}H$ (255.4 g), sodium propionate (0.30 g), and isopropanol (75.0 g) were added to a 500 mL round bottom flask. The flask was equipped with an overhead stirrer, condenser, heating mantle and temperature controller. The mixture was heated to 85° C. under a nitrogen blanket. Chloroplatinic acid (CPA) in ethanol (10 ppm based on Pt) was added and held at 85° C. for 15 hours. The digestion test showed 1 mL of per mL. An additional 40.5 g of the polyether was added followed by another aliquot of CPA (10 ppm Pt). The material was held at 80° C. for an additional 2 hours. The product was transferred to a single neck flask and placed on a rotary evaporator. Stripping commenced at 90° C. and 50 Torr for 2 hours. The color of the material was dark gray wax at room temperature. The average molecular weight and water solubility of the foaming agent product of this example are set forth in Table 1 below.

Synthetic Example H 1-(2-Trimethylsilylethyl)-1,1,3,3-tetramethyldisiloxane (246.8 g), an allyl-functional polyether with the average structure of $CH_2\!\!=\!\!CHCH_2O(CH_2CH_2O)_{14.4}H$ (53.2 g), sodium propionate (0.30 g), and isopropanol (75.0 g) were added to the round bottom flask. The flask was equipped with an overhead stirrer, condenser, heating mantle and temperature controller. The mixture was heated to 85° C. under a nitrogen blanket. Chloroplatinic acid (CPA) in ethanol (10 ppm based on Pt) was added and held at 85° C. for 3 hours. No hydrogen evolved during the digestion test indicating complete hydrosilylation. The product was transferred to a single neck flask and placed on a rotary evaporator. Stripping commenced at 90° C. and 50 Torr for 2 hours. The color of the material was light gray wax at room temperature. The average molecular weight and water solubility of the foaming agent product of this example are set forth in Table 1 below.

COMPARATIVE EXAMPLES

The composition of comparative silicone foaming agents COMP A to COMP G are listed below:
Comp A: $Me_3Si[(OSiMe_2)_{18}(OSiMeP)_{4.5}]OSiMe_3$, where $P\!=\!\!-C_3H_6(OC_2H_4)_{17.5}OH$
Comp B: $Me_3Si[(OSiMe_2)_{15}(OSiMeP)_{5.5}]OSiMe_3$, where $P\!=\!\!-C_3H_6(OC_2H_4)_{17}OCH3$
Comp C: $Me_3Si[(OSiMe_2)_{74}(OSiMeP)_9]OSiMe_3$, where $P\!=\!\!-C_3H_6(OC_2H_4)_{23}(OC_3H_6)_{26}OH$
Comp D: $Me_3Si[(OSiMe_2)_{74}(OSiMeP)_9]OSiMe_3$, where $P\!=\!\!-C_3H_6(OC_2H_4)_{23}(OC_3H_6)_{5.8}OH$
Comp E: $P(OSiMe_2)_{12}P$, where $P\!=\!\!-C_3H_6(OC_2H_4)_{12}OH$
Comp F: $Me_3Si[(OSiMe_2)_{15}(OSiMeP)_{5.5}]OSiMe_3$, where $P\!=\!\!-C_3H_6(OC_2H_4)_{7.5}OH$
Comp G: $Me_3Si(OSiMeP)_{1.9}OSiMe_3$, where $P\!=\!\!-C_3H6(OC_2H_4)_{7.5}OCH3$.

These materials were made with standard procedures. The average molecular weight and water solubility of the foaming agent product of this example are set forth in Table 1 below.

TABLE 1

(Average molecular weight and water solubility of the synthetic and comparative examples)

| Material | Average molecular weight (daltons) | Solubility in deionized water at 25° C., @ 1% |
|---|---|---|
| Example A | 800 | Soluble |
| Example B | 970 | Soluble |
| Example C | 725 | Dispersible (hazy) |
| Example D | 810 | Soluble |
| Example E | 1585 | Soluble |
| Example F | 770 | Soluble |
| Example G | 940 | Soluble |
| Example H | 910 | Soluble |
| Comp A | 5500 | Soluble |
| Comp B | 6000 | Soluble |
| Comp C | 30000 | Soluble |
| Comp D | 19000 | Soluble |
| Comp E | 2000 | Soluble |
| Comp F | 3800 | Soluble |
| Comp G | 1100 | Soluble |

TESTING EXAMPLES

Testing Example 1

A series of screening tests were performed on the foaming agents of Examples A to H and Comparative Examples A to G to identify materials that have a potential to be efficient foaming agents in foam assisted lift with high level of hydrocarbon condensates.
Two systems were used to simulate gas well conditions:
(a) 50% deionized water and 50% hexanes; and
(b) 30% NaCl solution (3%) and 70% hexanes.
The foam was prepared by using a Warring blender. One gram of foaming agent was dissolved in the aqueous phase, and then hexane was added to obtain 200 mL of mixture in the blender. The liquid was then stirred with the blender for 30 sec at 18,000 rpm and it was observed if a stable foam formed or not.

TABLE 2

(Foaming of aqueous/hexane mixtures in the presence of various organo-odified silicones.)

| Material | DI water/ Hexane (50/50) | 3% NaCl solution/ Hexane (30:70) |
|---|---|---|
| Comp A | No foam | No foam |
| Comp B | No foam | No foam |
| Comp C | Foam | No foam |
| Comp D | Foam | No foam |
| Example A | Foam | Foam |
| Example B | Foam | Foam |
| Example C | Foam | Foam |
| Example D | Foam | Foam |
| Example E | Foam | Foam |
| Example F | Foam | Foam |
| Example G | Foam | Foam |
| Example H | Foam | Foam |
| Comp E | Foam | No foam |
| Comp F | No foam | No foam |
| Comp G | Foam | Foam |

Table 2 shows that only a few of the comparative examples, but all the synthetic examples of the invention, provided efficient foaming with both liquids. Except for the foaming agent of Example E, all of the foaming agents of the invention possess molecular weights below 1,000 daltons. All of the Comparative foaming agent possessed molecular weights above 1,000 and all but Comparative Example G failed with the 3% NaCl solution with hexane.

Testing Example 2

The liquid unloading ability of various foamants, at various doses was investigated using the dynamic foam testing apparatus described by Yang, J., Jovancicevic, V. and Ramachadran, S.: "Foam for gas well deliquification", *Colloids and Surfaces A: Physicochem. Eng. Aspects*, 309 (2007) pp 177-181. One hundred milliliters of liquid was added into a jacketed glass column (77/70 cm height by 5 cm diameter) with medium glass frit at the bottom and an outlet arm at the top. Nitrogen gas at a fixed flow rate of 7 l/min (i.e. 0.425 m³/h) was used to create the foam. The liquid could be removed by the foam only if the foam was stable enough to reach the outlet pipe at the top (70 cm height) and then it was collected. The amount of liquid unloaded by foam after 5 min was used to quantify the efficiency of the foamant.
The foamant was first dissolved in the aqueous phase before the hydrocarbon was added. Hexane, decane or a hydrocarbon mixture containing hexane, decane, octane and cyclohexane, at 1:1:1:1 ratio were the hydrocarbon phase and 3% NaCl brine solution as aqueous phase and the volumetric hydrocarbons to brine ratio was 70:30.

TABLE 3

(Liquid unloading with various foamants, hydrocarbons and foamant doses.)

| Hydrocarbons | Surfactant Name | Dosage, g | Unloaded liquid, gram | Unloaded liquid, ml |
|---|---|---|---|---|
| Hexane | Comp G | 0.101 | 0 | 0 |
| Hexane | Example A | 0.101 | 31.2 | 38.5 |
| Decane | Example B | 0.18 | 38 | 48 |
| Decane | Example A | 0.107 | 20.1 | 27 |
| Decane | Example B | 0.102 | 29 | 38 |
| Mixture | Example A | 0.099 | 12.2 | 16 |
| Mixture | Example B | 0.098 | 30.4 | 37 |
| Mixture | Example B | 0.112 | 32.8 | 42.5 |
| Hexane | Example D | 0.12 | 19.2 | 23.5 |
| Hexane | Example E | 0.125 | 69.2 | 73 |
| Hexane | Example F | 0.22 | 39.5 | 48 |
| Hexane | Example F | 0.115 | 19.3 | 22 |
| Hexane | Example H | 0.12 | 12.5 | 15 |

Table 3 shows that the Examples of the invention exhibited good performance with all the hydrocarbons studied, while the comparative example did not form stable enough foams to unload any liquid.

Testing Example 3

The effect of hydrocarbon chemistry on foaming performance of the new materials was investigated by using various hydrocarbons. One hundred milliliters of liquid containing 30 vol. % aqueous NaCl (3%) and 0.05 g of foamant and 70 vol. % of hydrocarbon was added into a one liter graduated cylinder. Nitrogen gas was sparged, at two liters per minute flow rate through a medium pore glass frit that was immersed in the liquid mixture. The foam height after 5 min of sparging was used to quantify the foaming efficiency.

TABLE 4

(Foam volume formed in the presence of various hydrocarbons.)

| | Foam height, ml | | | | | |
|---|---|---|---|---|---|---|
| | Hexanes | Pentanes | Decane | Octane | Cyclohexane | Mixture |
| Example A | 800 | >1000 | 550 | 750 | 650 | 700 |

*n-Decane + n-octane + hexanes + cyclohexane (1:1:1:1)

Table 4 shows that a high amount of foam formed from all the individual hydrocarbons as well as from their mixture using Example A as foamant.

Testing Example 4

Example A was used as a surfactant, at various doses and hexane was used to simulate gas condensates. The same method was used as described in testing example 2.

The aqueous phase was 3% NaCl solution and the volumetric hydrocarbon to brine ratio was 70:30 by volume.

TABLE 5

(Effect of foamant dose on liquid unloading.)

| Surfactant Name | Dosage, g | Unloaded foam, gram | Unloaded foam, ml |
|---|---|---|---|
| Example A | 0 | 0 | 0 |
| | 0.050 | 1.6 | 2 |
| | 0.071 | 6.5 | 9 |
| | 0.091 | 26.6 | 33 |
| | 0.126 | 37.0 | 46 |
| | 0.180 | 42.9 | 54 |

Table 5 shows that Example A was an effective liquid unloading foamant from as low as about 0.1 g/100 ml concentration.

Testing Example 5

The effect of hydrocarbon to brine ratio was studied using the same method as in Testing example 2, using again hexane/3% NaCl solution mixtures. Example A at 0.10 g/100 ml liquid was used as a foaming agent.

TABLE 6

(Effect of hydrocarbon to brine ratio on liquid unloading.)

| Volumetric ratio of hexane to 3% NaCl solution | Unloaded foam, gram | Unloaded foam, ml |
|---|---|---|
| 100:0 | 0 | 0 |
| 90:10 | 15.2 | 27 |
| 80:20 | 28.2 | 32.1 |
| 70:30 | 31.2 | 38.5 |
| 50:50 | 42.5 | 52 |
| 40:60 | 46.5 | 53 |
| 32.5:67.5 | 45.5 | 50 |
| 25:75 | 26.6 | 28 |
| 10:90 | 49 | 51 |
| 0:100 | 66.3 | 66 |

Table 6 shows that Example A worked as an effective foaming agent at any condensate/brine ratio if aqueous phase was present in the mixture.

Testing Example 6

Liquid unloading was studied at elevated temperature using the same method as in Testing Example 2, using again hexane/3% NaCl solution mixtures.

TABLE 7

(Liquid unloading at 55° C.)

| Surfactant Name | Dosage, g | Unloaded liquid, gram | Unloaded liquid, ml |
|---|---|---|---|
| Example B | 0.125 | 53.3 | 62 |
| Example D | 0.12 | 25.6 | 31 |
| Example E | 0.12 | 53.9 | 67 |
| Example G | 0.115 | 42.1 | 46 |
| Example H | 0.12 | 20 | 24 |

Table 7 shows that the examples of our invention worked as effective foaming agents at elevated temperature.

It can be seen that, as compared with the compositions disclosed in U.S. Patent Publication 2007/0079963, which employs polysiloxane having a molecular weight of about 1000 to about 1,000,000 daltons (and in a preferred range, 6000-60,000 daltons), the siloxane of the present invention provides superior results with a molecular weight below 1,000 daltons. For example, in Examples A, B and C the molecular weight ranged from 725 (Example C) to 970 (Example A), all of which achieved foaming. These results are unexpected in view of the recommendation of said publication for higher molecular weight and failure to achieve acceptable results below 1000 daltons, as demonstrated in Example 3 of U.S. Patent Publication 2007/0079963 wherein a polysiloxane having a molecular weight of 600 failed to achieve foaming.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A composition providing a stable foam, comprising
   (a) an aqueous liquid;
   (b) at least one, water soluble or dispersible, silicon-containing polyether foamant contained within the aqueous liquid; and
   (c) a non-aqueous liquid
where
the aqueous liquid (a) comprises water and minerals (brine), the non-aqueous liquid (c) substantially comprises liquid hydrocarbons, and
the silicon-containing polyether foamant (b) in the aqueous liquid (a) is defined as $$M_a M^A_b M^B_c M^C_d M^E_e D_f D^E_g T_h T^E_i Q_j \text{ with}$$

$M=R^1R^2R^3SiO_{1/2}$;
$M^A=R^4R^5R^6SiR^E$;
$M^B=[(R^7R^8R^9Si)_k R^{10}]_l Si(R^{11})_m(R^{12})_n R^E$;
$M^C=[(R^{13}R^{14}R^{15}Si)_o R^{16}]_p Si(R^{17})_q(R^{18})_r O_{1/2}$;
$M^E=R^{19}R^{20}R^E SiO_{1/2}$;
$D=R^{21}R^{22}SiO_{2/2}$;
$D^E=R^{23}R^E SiO_{2/2}$;
$T=R^{24}SiO_{3/2}$;
$T^E=R^E SiO_{2/2}$; and
$Q=SiO_{4/2}$;
wherein
$R^1$, $R^2$, $R^3$, $R^4$, $R^5$, $R^6$, $R^7$, $R^8$, $R^9$, $R^{11}$, $R^{12}$, $R^{13}$, $R^{14}$, $R^{15}$, $R^{17}$, $R^{18}$, $R^{19}$, $R^{20}$, $R^{21}$, $R^{22}$, $R^{23}$ and $R^{24}$ are each independently selected from the group of $OR^{25}$ or monovalent hydrocarbon radicals, optionally containing heteroatoms and hydroxyl groups, having from about 1 to about 20 carbon atoms;
$R^{10}$ and $R^{16}$ are polyvalent linear or branched unsaturated or saturated hydrocarbon radicals, optionally containing heteroatoms and hydroxyl groups, subject to the limitation that the valency of $R^{10}$ and $R^{16}$ is at least one and less than about 30;
$R^E$ is a monovalent radical defined as: $-R^{26}-(C_2H_4O)_s (C_3H_6O)_t(C_4H_8O)_u-R^{27}$ with the provision that the polymer must contain at least one $R^E$ group;
$R^{25}$ is a monovalent, linear or branched unsaturated or saturated hydrocarbon radical optionally containing heteroatoms and hydroxyl groups, having from about 1 to about 20 carbon atoms;
$R^{26}$ is oxygen or a divalent, linear or branched unsaturated or saturated hydrocarbon radical, optionally containing heteroatoms and hydroxyl groups, with about 2 to about 30 carbon atoms;
$R^{27}$ is H or $-C(=O)CH_3$ or a monovalent saturated or unsaturated hydrocarbon radical, optionally containing heteroatoms and hydroxyl groups, having from 1 to about 30 carbon atoms;
subscripts a, e, f, g, h, i and j are 0 or a positive integer subject to the limitation $1 \leq a+b+c+d+e+f+g+h+i+j<$ about 300;
subscript b is 0 or 1 subject to the limitation if b is 1 then $a+c+d+e+f+g+h+i+j=0$;
subscript c is 0 or 1 subject to the limitation if c is 1 then $a+b+d+e+f+g+h+i+j=0$;
subscript d is 0 or positive, subject to the proviso that if $b+c=0$ then d is positive;
subscript k is positive subject to the limitation $0<k<$ about 30 and k is equal the valency of $R^{10}-1$;
subscript l is positive;
subscripts m and n are zero or positive subject to the limitation $l+m+n=3$;
subscript o is positive subject to the limitation $0<o<$ about 30 and o is equal the valency of $R^{16}-1$;
subscript p is positive
subscripts q and r are individually zero or positive subject to the proviso that $p+q+r=3$; and
subscripts s, t and u are zero or positive subject to the limitation that $s+t+u \geq$ about 3.

2. The composition of claim 1 wherein said silicon-containing polyether foamant (b) comprises a compound having the following formula:

$$M_a M^A_b M^B_c M^C_d M^E_e D_f D^E_g T_h T^E_i Q_j \text{ with}$$

$M=R^1R^2R^3SiO_{1/2}$;
$M^A=R^4R^5R^6SiR^E$;
$M^B=[(R^7R^8R^9Si)_k R^{10}]_l Si(R^{11})_m(R^{12})_n R^E$;
$M^C=[(R^{13}R^{14}R^{15}Si)_o R^{16}]_p Si(R^{17})_q(R^{18})_r O_{1/2}$;
$M^E=R^{19}R^{20}R^E SiO_{1/2}$;
$D=R^{21}R^{22}SiO_{2/2}$;
$D^E=R^{23}R^E SiO_{2/2}$;
$T=R^{24}SiO_{3/2}$;
$T^E=R^E SiO_{2/2}$; and
$Q=SiO_{4/2}$;
wherein
$R^1$, $R^2$, $R^3$, $R^4$, $R^5$, $R^6$, $R^7$, $R^8$, $R^9$, $R^{11}$, $R^{12}$, $R^{13}$, $R^{14}$, $R^{15}$, $R^{17}$, $R^{18}$, $R^{19}$, $R^{20}$, $R^{21}$, $R^{22}$, $R^{23}$ and $R^{24}$ are each independently selected from the group of $OR^{25}$ or monovalent hydrocarbon radicals, optionally containing heteroatoms and hydroxyl groups, having from about 1 to about 15 carbon atoms;
$R^{10}$ and $R^{16}$ are polyvalent linear or branched unsaturated or saturated hydrocarbon radicals, optionally containing heteroatoms and hydroxyl groups, subject to the limitation that the valency of $R^{10}$ and $R^{16}$ is at least one and less than about 25;
$R^E$ is a monovalent radical defined as: $-R^{26}-(C_2H_4O)_s (C_3H_6O)_t(C_4H_8O)_u-R^{27}$ with the provision that the polymer must contain at least one $R^E$ group;
$R^{25}$ is a monovalent, linear or branched unsaturated or saturated hydrocarbon radical optionally containing heteroatoms and hydroxyl groups, having from about 1 to about 15 carbon atoms;
$R^{26}$ is oxygen or a divalent, linear or branched unsaturated or saturated hydrocarbon radical, optionally containing heteroatoms and hydroxyl groups, with about 2 to about 25 carbon atoms;
$R^{27}$ is H or $-C(=O)CH_3$ or a monovalent saturated or unsaturated hydrocarbon radical, optionally containing heteroatoms and hydroxyl groups, having 1 to about 25 carbon atoms, optionally containing heteroatoms and hydroxyl group;

subscripts a, e, f, g, h, i and j are individually 0 or positive subject to the limitation $1 \leq a+b+c+d+e+f+g+h+i+j <$ about 200;

subscript b is 0 or 1 subject to the limitation if b is 1 then $a+c+d+e+f+g+h+i+j=0$;

subscript c is 0 or 1 subject to the limitation if c is 1 then $a+b+d+e+f+g+h+i+j=0$;

subscript d is 0 or positive, subject to the proviso that if $b+c=0$ then d is positive subscript k is positive subject to the limitation $0<k<25$ and k is equal the valency of $R^{10}-1$;

subscript l is positive subscripts m and n are zero or positive subject to the limitation $l+m+n=3$;

subscript o is positive subject to the limitation $0<o<$ about 25 and o is equal the valency of $R^{16}-1$;

subscript p is positive;

subscripts q and r are individually zero or positive subject to the proviso that $p+q+r=3$; and subscripts s, t and u are zero or positive subject to the limitation that $s+t+u \geq 3$.

3. The composition of claim 1 wherein said silicon-containing polyether foamant (b) comprises a compound having the following formula:

$$M_a M^A{}_b M^B{}_c M^C{}_d M^E{}_e D_f D^E{}_g T_h T^E{}_i Q_j \text{ with}$$

$M = R^1 R^2 R^3 SiO_{1/2}$;
$M^A = R^4 R^5 R^6 SiR^E$;
$M^B = [(R^7 R^8 R^9 Si)_k R^{10}]_l Si(R^{11})_m (R^{12})_n R^E$;
$M^C = [(R^{13} R^{14} R^{15} Si)_o R^{16}]_p Si(R^{17})_q (R^{18})_r O_{1/2}$;
$M^E = R^{19} R^{20} R^E SiO_{1/2}$;
$D = R^{21} R^{22} SiO_{2/2}$;
$D^E = R^{23} R^E SiO_{2/2}$;
$T = R^{24} SiO_{3/2}$;
$T^E = R^E SiO_{2/2}$; and
$Q = SiO_{4/2}$;

wherein $R^1, R^2, R^3, R^4, R^5, R^6, R^7, R^8, R^9, R^{11}, R^{12}, R^{13}, R^{14}, R^{15}, R^{17}, R^{18}, R^{19}, R^{20}, R^{21}, R^{22}, R^{23}$ and $R^{24}$ are each independently selected from the group of $OR^{25}$ or monovalent hydrocarbon radicals, optionally containing heteroatoms and hydroxyl groups, having from about 1 to about 10 carbon atoms;

$R^{10}$ and $R^{16}$ are polyvalent linear or branched unsaturated or saturated hydrocarbon radicals, optionally containing heteroatoms and hydroxyl groups, subject to the limitation that the valency of $R^{10}$ and $R^{16}$ is at least one and less than about 20;

$R^E$ is a monovalent radical defined as: $-R^{26}-(C_2H_4O)_s(C_3H_6O)_t(C_4H_8O)_u-R^{27}$ with the provision that the polymer must contain at least one $R^E$ group;

$R^{25}$ is a monovalent, linear or branched unsaturated or saturated hydrocarbon radical optionally containing heteroatoms and hydroxyl groups, having from about 1 to about 10 carbon atoms;

$R^{26}$ is oxygen or a divalent, linear or branched unsaturated or saturated hydrocarbon radical, optionally containing heteroatoms and hydroxyl groups, with about 2 to about 20 carbon atoms;

$R^{27}$ is H or $-C(=O)CH_3$ or a monovalent saturated or unsaturated hydrocarbon radical, optionally containing heteroatoms and hydroxyl groups, having from 1 to about 20 carbon atoms, optionally containing heteroatoms and hydroxyl group;

subscripts a, e, f, g, h, i and j are individually 0 or positive subject to the limitation $a+1 \leq b+c+d+e+f+g+h+i+j <$ about 100;

subscript b is 0 or 1 subject to the limitation if b is 1 then $a+c+d+e+f+g+h+i+j=0$;

subscript c is 0 or 1 subject to the limitation if c is 1 then $a+b+d+e+f+g+h+i+j=0$;

subscript d is 0 or positive subject to the proviso that if $b+c=0$ then d is positive;

subscript k is positive subject to the limitation $0<k<20$ and k is equal the valency of $R^{10}-1$;

subscript l is positive;

subscripts m and n are individually zero or positive subject to the limitation $l+m+n=3$;

subscript o is positive subject to the limitation $0<o<20$ and o is equal the valency of $R^{16}-1$;

subscript p is positive;

subscripts q and r are individually zero or positive subject to the proviso that $p+q+r=3$; and subscripts s, t and u are individually zero or positive subject to the limitation that $s+t+u \geq 3$.

4. A composition providing a stable foam, comprising:

(a) an aqueous liquid;

(b) at least one, water soluble or dispersible, silicon-containing polyether foamant contained within the aqueous liquid; and (c) a non-aqueous liquid, where the aqueous liquid (a) comprises water and minerals (brine), the non-aqueous liquid (c) substantially comprises liquid hydrocarbons, and wherein said silicon-containing polyether foamant (b) in the aqueous liquid (a) comprises a compound having the following formula:

$$M_a D_f D^E{}_g \text{ with}$$

$M = R^1 R^2 R^3 SiO_{1/2}$;
$D = R^{21} R^{22} SiO_{2/2}$;
$D^E = R^{23} R^E SiO_{2/2}$;

wherein $R^1, R^2, R^3, R^{21}, R^{22}$ and $R^{23}$ are each independently selected from the group of $OR^{25}$ or monovalent hydrocarbon radicals, optionally containing heteroatoms and hydroxyl groups, having from about 1 to about 20 carbon atoms;

$R^E$ is a monovalent radical defined as: $-R^{26}-(C_2H_4O)_s(C_3H_6O)_t(C_4H_8O)_u-R^{27}$;

$R^{25}$ is a monovalent, linear or branched unsaturated or saturated hydrocarbon radical optionally containing heteroatoms and hydroxyl groups, having from about 1 to about 20 carbon atoms;

$R^{26}$ is oxygen or a divalent, linear or branched unsaturated or saturated hydrocarbon radical, optionally containing heteroatoms and hydroxyl groups, with about 2 to about 20 carbon atoms;

$R^{27}$ is H or $-C(=O)CH_3$ or a monovalent saturated or unsaturated hydrocarbon radical, optionally containing heteroatoms and hydroxyl groups, having from 1 to about 20 carbon atoms;

subscript g is positive;

subscripts a and f are 0 or positive subject to the limitation $a+f+g<$ about 15;

subscripts s, t and u are individually zero or positive subject to the limitation that $s+t+u \geq 3$; and, the average molecular weight of the silicon-containing polyether foamant is less than 1,000 daltons.

5. A composition providing a stable foam, comprising:
(a) an aqueous liquid;
(b) at least one, water soluble or dispersible, silicon-containing polyether foamant contained within the aqueous liquid; and
(c) a non-aqueous liquid,
where
the aqueous liquid (a) comprises water and minerals (brine), the non-aqueous liquid (c) substantially comprises liquid hydrocarbons, and
wherein said silicon-containing polyether foamant (b) in the aqueous liquid (a) comprises a compound having the following formula:

$$[(R^7R^8R^9Si)_kR^{10}]S_lSi(R^{11})_m(R^{12})_nR^E;$$

wherein
$R^7$, $R^8$, $R^9$, $R^{11}$ and $R^{12}$ are each independently selected from the group of $OR^{25}$ or monovalent hydrocarbon radicals, optionally containing heteroatoms and hydroxyl groups, having from about 1 to about 20 carbon atoms;
$R^{10}$ is a polyvalent linear or branched unsaturated or saturated hydrocarbon radical, optionally containing heteroatoms and hydroxyl groups, subject to the limitation that the valency of $R^{10}$ is at least one and less than about 30;
$R^E$ is a monovalent radical defined as: $-R^{26}-(C_2H_4O)_s(C_3H_6O)_t(C_4H_8O)_u-R^{27}$;
$R^{25}$ is a monovalent, linear or branched unsaturated or saturated hydrocarbon radical optionally containing heteroatoms and hydroxyl groups, having from about 1 to about 20 carbon atoms;
$R^{26}$ is oxygen or a divalent, linear or branched unsaturated or saturated hydrocarbon radical, optionally containing heteroatoms and hydroxyl groups, with about 2 to about 30 carbon atoms;
$R^{27}$ is H or $-C(=O)CH_3$ or a monovalent saturated or unsaturated hydrocarbon radical, optionally containing heteroatoms and hydroxyl groups, having from 1 to about 30 carbon atoms;
subscript l is positive;
subscripts m and n are individually zero or positive subject to the limitation l+m+n=3.

6. The composition of claim 1 wherein said silicon-containing polyether foamant (b) comprises the compound having the following formula:

$$M^C_aD_fD^E_g \text{ with}$$
$$M^C=[(R^{13}R^{14}R^{15}Si)_oR^{16}]_pSi(R^{17})_q(R^{18})_rO_{1/2};$$
$$D=R^{21}R^{22}SiO_{2/2};$$
$$D^E=R^{23}R^ESiO_{2/2};$$

wherein
$R^{13}$, $R^{14}$, $R^{15}$, $R^{17}$, $R^{18}$, $R^{21}$, $R^{22}$ and $R^{23}$ are each independently selected from the group of $OR^{25}$ or monovalent hydrocarbon radicals, optionally containing heteroatoms and hydroxyl groups, having from about 1 to about 20 carbon atoms;
$R^{16}$ is a polyvalent linear or branched unsaturated or saturated hydrocarbon radicals, optionally containing heteroatoms and hydroxyl groups, subject to the limitation that the valency of $R^{16}$ is at least one and less than about 30;
$R^E$ is a monovalent radical defined as: $-R^{26}-(C_2H_4O)_s(C_3H_6O)_t(C_4H_8O)_u-R^{27}$;
$R^{25}$ is a monovalent, linear or branched unsaturated or saturated hydrocarbon radical optionally containing heteroatoms and hydroxyl groups, having from about 1 to about 20 carbon atoms;
$R^{26}$ is oxygen or a divalent, linear or branched unsaturated or saturated hydrocarbon radical, optionally containing heteroatoms and hydroxyl groups, with about 2 to about 30 carbon atoms;
$R^{27}$ is H or $-C(=O)CH_3$ or a monovalent saturated or unsaturated hydrocarbon radical, optionally containing heteroatoms and hydroxyl groups, having from 1 to about 30 carbon atoms;
subscripts d and g are positive;
subscript f is 0 or positive subject to the proviso that d+f+g<about 20;
subscript o is positive subject to the limitation that 0<o<30 and o is equal the valency of $R^{16}-1$;
subscript p is positive;
subscripts q and r are individually zero or positive subject to the proviso that p+q+r=3; and
subscripts s, t and u are individually zero or positive subject to the limitation that s+t+u≧3.

7. A composition providing a stable foam, comprising:
(a) an aqueous liquid;
(b) at least one, water soluble or dispersible, silicon-containing polyether foamant contained within the aqueous liquid; and
(c) a non-aqueous liquid,
where
the aqueous liquid (a) comprises water and minerals (brine), the non-aqueous liquid (c) substantially comprises liquid hydrocarbons, and
wherein said silicon-containing polyether foamant (b) in the aqueous liquid (a) comprises a compound having the following formula:

$$M^A=R^4R^5R^6SiR^E;$$

wherein
$R^4$, $R^5$ and $R^6$ are each independently selected from the group of $OR^{25}$ or monovalent hydrocarbon radicals, optionally containing heteroatoms and hydroxyl groups, having from about 1 to about 20 carbon atoms;
$R^E$ is a monovalent radical defined as: $-R^{26}-(C_2H_4O)_s(C_3H_6O)_t(C_4H_8O)_u-R^{27}$;
$R^{25}$ is a monovalent, linear or branched unsaturated or saturated hydrocarbon radical optionally containing heteroatoms and hydroxyl groups, having from about 1 to about 20 carbon atoms;
$R^{26}$ is oxygen or a divalent, linear or branched unsaturated or saturated hydrocarbon radical, optionally containing heteroatoms and hydroxyl groups, with about 2 to about 30 carbon atoms;
$R^{27}$ is H or $-C(=O)CH_3$ or a monovalent saturated or unsaturated hydrocarbon radical, optionally containing heteroatoms and hydroxyl groups, having from 1 to about 30 carbon atoms;
subscripts s, t and u are individually zero or positive subject to the limitation that s+t+u≧3.

8. A method of making a stable foam from aqueous liquids by combining said aqueous liquids with a gas, in the presence of hydrocarbon liquids, with a foamant comprising at least one, water soluble or dispersible, silicon-containing polyether defined as $$M_aM^A_bM^B_cM^C_dM^E_eD_fD^E_gT_hT^E_iQ_j \text{ with}$$
$$M=R^1R^2R^3SiO_{1/2};$$
$$M^A=R^4R^5R^6SiR^E;$$
$$M^B=[(R^7R^8R^9Si)_kR^{10}]_lSi(R^{11})_m(R^{12})_nR^E;$$
$$M^C=[(R^{13}R^{14}R^{15}Si)_oR^{16}]_pSi(R^{17})_q(R^{18})_rO_{1/2};$$
$$M^E=R^{19}R^{20}R^ESiO_{1/2};$$
$$D=R^{21}R^{22}SiO_{2/2};$$

$D^E = R^{23}R^E SiO_{2/2}$;
$T = R^{24}SiO_{3/2}$;
$T^E = R^E SiO_{2/2}$; and
$Q = SiO_{4/2}$;
wherein $R^1, R^2, R^3, R^4, R^5, R^6, R^7, R^8, R^9, R^{11}, R^{12}, R^{13}, R^{14}, R^{15}, R^{17}, R^{18}, R^{19}, R^{20}, R^{21}, R^{22}, R^{23}$ and $R^{24}$ are each independently selected from the group of $OR^{25}$ or monovalent hydrocarbon radicals, optionally containing heteroatoms and hydroxyl groups, having from about 1 to about 20 carbon atoms;

$R^{10}$ and $R^{16}$ are polyvalent linear or branched unsaturated or saturated hydrocarbon radicals, optionally containing heteroatoms and hydroxyl groups, subject to the limitation that the valency of $R^{10}$ and $R^{16}$ is at least one and less than about 30;

$R^E$ is a monovalent radical defined as: $-R^{26}-(C_2H_4O)_s(C_3H_6O)_t(C_4H_8O)_u-R^{27}$ with the provision that the polymer must contain at least one $R^E$ group;

$R^{25}$ is a monovalent, linear or branched unsaturated or saturated hydrocarbon radical optionally containing heteroatoms and hydroxyl groups, having from about 1 to about 20 carbon atoms;

$R^{26}$ is oxygen or a divalent, linear or branched unsaturated or saturated hydrocarbon radical, optionally containing heteroatoms and hydroxyl groups, with about 2 to about 30 carbon atoms;

$R^{27}$ is H or $-C(=O)CH_3$ or a monovalent saturated or unsaturated hydrocarbon radical, optionally containing heteroatoms and hydroxyl groups, having from 1 to about 30 carbon atoms;

subscripts a, e, f, g, h, i and j are individually 0 or positive subject to the limitation $1 \leq a+b+c+d+e+f+g+h+i+j < 300$;

subscript b is 0 or 1 subject to the limitation if b is 1 then $a+c+d+e+f+g+h+i+j=0$;

subscript c is 0 or 1 subject to the limitation if c is 1 then $a+b+d+e+f+g+h+i+j=0$;

subscript d is 0 or positive subject to the proviso that if $b+c=0$ then d is positive;

subscript k is positive subject to the limitation $0 < k < 30$ and k is equal the valency of $R^{10}-1$;

subscript l is positive subscripts m and n are individually zero or positive subject to the limitation $l+m+n=3$;

subscript o is positive subject to the limitation $0 < o < 30$ and o is equal the valency of $R^{16}-1$;

subscript p is positive;

subscripts q and r are individually zero or positive subject to the proviso that $p+q+r=3$; and subscripts s, t and u are individually zero or positive subject to the limitation $s+t+u \geq 3$.

9. A method of making a stable foam from aqueous liquids by combining said aqueous liquids with a gas, in the presence of hydrocarbon liquids, with a foamant comprising at least one, water soluble or dispersible, silicon-containing polyether defined as $M_a D_f D^E_g$ with $M = R^1 R^2 R^3 SiO_{1/2}$;
$D = R^{21}R^{22}SiO_{2/2}$;
$D^E = R^{23}R^E SiO_{2/2}$;
wherein $R^1, R^2, R^3, R^{21}, R^{22}$ and $R^{23}$ are each independently selected from the group of $OR^{25}$ or monovalent hydrocarbon radicals, optionally containing heteroatoms and hydroxyl groups, having from about 1 to about 20 carbon atoms;

$R^E$ is a monovalent radical defined as: $-R^{26}-(C_2H_4O)_s(C_3H_6O)_t(C_4H_8O)_u-R^{27}$;

$R^{25}$ is a monovalent, linear or branched unsaturated or saturated hydrocarbon radical optionally containing heteroatoms and hydroxyl groups, having from about 1 to about 20 carbon atoms;

$R^{26}$ is oxygen or a divalent, linear or branched unsaturated or saturated hydrocarbon radical, optionally containing heteroatoms and hydroxyl groups, with about 2 to about 20 carbon atoms;

$R^{27}$ is H or $-C(=O)CH_3$ or a monovalent saturated or unsaturated hydrocarbon radical, optionally containing heteroatoms and hydroxyl groups, having from 1 to about 20 carbon atoms;

subscript g is positive;

subscripts a and f are individually 0 or positive subject to the limitation that $a+f+g <$ about 15 subscripts s, t and u are individually zero or positive subject to the limitation that $s+t+u \geq 3$; and, the average molecular weight of the silicon-containing polyether foamant is less than 1,000 daltons.

10. A method of making a stable foam from aqueous liquids by combining said aqueous liquids with a gas, in the presence of hydrocarbon liquids, with a foamant comprising at least one, water soluble or dispersible, silicon-containing polyether defined as $[(R^7 R^8 R^9 Si)_k R^{10}]_l Si(R^{11})_m (R^{12})_n R^E$;

wherein $R^7, R^8, R^9, R^{11}$ and $R^{12}$ are each independently selected from the group of $OR^{25}$ or monovalent hydrocarbon radicals, optionally containing heteroatoms and hydroxyl groups, having from about 1 to about 20 carbon atoms;

$R^{10}$ is a polyvalent linear or branched unsaturated or saturated hydrocarbon radical, optionally containing heteroatoms and hydroxyl groups, subject to the limitation that the valency of $R^{10}$ is at least one and less than about 30;

$R^E$ is a monovalent radical defined as: $-R^{26}-(C_2H_4O)_s(C_3H_6O)_t(C_4H_8O)_u-R^{27}$;

$R^{25}$ is a monovalent, linear or branched unsaturated or saturated hydrocarbon radical optionally containing heteroatoms and hydroxyl groups, having from about 1 to about 20 carbon atoms;

$R^{26}$ is oxygen or a divalent, linear or branched unsaturated or saturated hydrocarbon radical, optionally containing heteroatoms and hydroxyl groups, with about 2 to about 30 carbon atoms;

$R^{27}$ is H or $-C(=O)CH_3$ or a monovalent saturated or unsaturated hydrocarbon radical, optionally containing heteroatoms and hydroxyl groups, having from 1 to about 30 carbon atoms;

subscript l is positive;

subscripts m and n are individually zero or positive subject to the limitation $l+m+n=3$.

11. The foaming method of claim 8 wherein said silicon-containing polyether foamant (b) comprises the compound having the following formula:

$M^C_d D_f D^E_g$ with $M^C = [(R^{13}R^{14}R^{15}Si)_o R^{16}]_p Si(R^{17})_q (R^{18})_r O_{1/2}$;
$D = R^{21}R^{22}SiO_{2/2}$;
$D^E = R^{23}R^E SiO_{2/2}$;

wherein $R^{13}$, $R^{14}$, $R^{15}$, $R^{17}$, $R^{18}$, $R^{21}$, $R^{22}$ and $R^{23}$ are each independently selected from the group of $OR^{25}$ or monovalent hydrocarbon radicals, optionally containing heteroatoms and hydroxyl groups, having from about 1 to about 20 carbon atoms;

$R^{16}$ is a polyvalent linear or branched unsaturated or saturated hydrocarbon radicals, optionally containing heteroatoms and hydroxyl groups, subject to the limitation that the valency of $R^{16}$ is at least one and less than about 30;

$R^E$ is a monovalent radical defined as: $-R^{26}-(C_2H_4O)_s(C_3H_6O)_t(C_4H_8O)_u-R^{27}$;

$R^{25}$ is a monovalent, linear or branched unsaturated or saturated hydrocarbon radical optionally containing heteroatoms and hydroxyl groups, having from about 1 to about 20 carbon atoms;

$R^{26}$ is oxygen or a divalent, linear or branched unsaturated or saturated hydrocarbon radical, optionally containing heteroatoms and hydroxyl groups, with about 2 to about 30 carbon atoms;

$R^{27}$ is H or $-C(=O)CH_3$ or a monovalent saturated or unsaturated hydrocarbon radical, optionally containing heteroatoms and hydroxyl groups, having from 1 to about 30 carbon atoms;

subscripts d and g are positive;

subscript f is 0 or positive subject to the limitation that $d+f+g<$ about 20;

subscript o is positive subject to the limitation that $0<o<30$ and o is equal the valency of $R^{16}-1$;

subscript p is positive;

subscripts q and r are individually zero or positive subject to the proviso that $p+q+r=3$; and subscripts s, t and u are individually zero or positive subject to the limitation that $s+t+u\geq 3$.

12. A method of making a stable foam from aqueous liquids by combining said aqueous liquids with a gas, in the presence of hydrocarbon liquids, with a foamant comprising at least one, water soluble or dispersible, silicon-containing polyether defined as

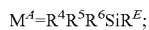

wherein $R^4$, $R^5$ and $R^6$ are each independently selected from the group of $OR^{25}$ or monovalent hydrocarbon radicals, optionally containing heteroatoms and hydroxyl groups, having from about 1 to about 20 carbon atoms;

$R^E$ is a monovalent radical defined as: $-R^{26}-(C_2H_4O)_s(C_3H_6O)_t(C_4H_8O)_u-R^{27}$;

$R^{25}$ is a monovalent, linear or branched unsaturated or saturated hydrocarbon radical optionally containing heteroatoms and hydroxyl groups, having from about 1 to about 20 carbon atoms;

$R^{26}$ is oxygen or a divalent, linear or branched unsaturated or saturated hydrocarbon radical, optionally containing heteroatoms and hydroxyl groups, with about 2 to about 30 carbon atoms;

$R^{27}$ is H or $-C(=O)CH_3$ or a monovalent saturated or unsaturated hydrocarbon radical, optionally containing heteroatoms and hydroxyl groups, having from 1 to about 30 carbon atoms;

subscripts s, t and u are individually zero or positive subject to the limitation that $s+t+u\geq 3$.

13. A method for removing liquid loading from gas wells comprising adding the foamant produced according to the method of claim 8 to said gas wells and removing said stable foam from said gas wells once formed.

14. A method for foam fracturing in drilling operations adding the foamant produced according to the method of claim 8 to said well being drilled.

15. A method for lifting formation fluids to the surface in oil wells comprising adding the foamant produced according to the method of claim 8 to said oil wells having fluids and lifting said formation fluids to the surface of said oil wells after they combine with said foamant.

16. The composition of claim 4 wherein $R^{27}$ contains nitrogen and optionally is an amine.

17. The composition of claim 1 wherein subscript d is positive and subscripts b and c are zero.

18. The composition of claim 1 wherein subscript c or subscript b is positive and subscript d is zero.

19. The method of claim 8 wherein subscript d is positive and subscripts b and c are zero.

20. The method of claim 8 wherein subscript c or subscript b is positive and subscript d is zero.

* * * * *